(12) United States Patent
Huang et al.

(10) Patent No.: US 11,142,730 B2
(45) Date of Patent: Oct. 12, 2021

(54) WATER-SOLUBLE ARTICLES AND RELATED PROCESSES

(71) Applicant: The Procter & Gamble Company, Cincinnati, OH (US)

(72) Inventors: Sun-Jan Alan Huang, Cincinnati, OH (US); Mark Robert Sivik, Mason, OH (US); Frank William Denome, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 75 days.

(21) Appl. No.: 16/253,252

(22) Filed: Jan. 22, 2019

(65) Prior Publication Data
US 2019/0233780 A1    Aug. 1, 2019

Related U.S. Application Data

(60) Provisional application No. 62/622,159, filed on Jan. 26, 2018.

(51) Int. Cl.
| | |
|---|---|
| *C11D 17/04* | (2006.01) |
| *D04H 3/03* | (2012.01) |
| *D04H 3/018* | (2012.01) |
| *D06M 23/08* | (2006.01) |
| *B65D 65/46* | (2006.01) |
| *C11D 17/06* | (2006.01) |
| *B32B 3/12* | (2006.01) |
| *D04H 3/05* | (2006.01) |
| *C11D 1/24* | (2006.01) |
| *D06M 13/00* | (2006.01) |

(52) U.S. Cl.
CPC .............. *C11D 17/042* (2013.01); *B32B 3/12* (2013.01); *C11D 17/06* (2013.01); *D04H 3/018* (2013.01); *D04H 3/05* (2013.01); *D06M 23/08* (2013.01); *B32B 2260/02* (2013.01); *B32B 2307/7166* (2013.01); *B32B 2307/732* (2013.01); *B32B 2432/00* (2013.01); *C11D 1/24* (2013.01); *D06M 13/005* (2013.01)

(58) Field of Classification Search
CPC ........ C11D 17/04; C11D 17/042; D04H 3/05; D04H 3/018; D06M 23/08; B65D 65/46
See application file for complete search history.

(56) References Cited

U.S. PATENT DOCUMENTS

| | | |
|---|---|---|
| 3,293,718 A | 12/1966 | Sheets |
| 3,859,125 A | 1/1975 | Miller et al. |

(Continued)

FOREIGN PATENT DOCUMENTS

| | | |
|---|---|---|
| AU | 2004/202461 B2 | 11/2007 |
| CA | 2695068 A1 | 9/2010 |

(Continued)

OTHER PUBLICATIONS

PCT Search Report for appl. No. PCT/US2018/015354, dated May 14, 2018, 13 pages.

(Continued)

*Primary Examiner* — Brian P Mruk
(74) *Attorney, Agent, or Firm* — Carrie Schwartz (57) ABSTRACT

Water-soluble unit dose articles and processes for making such articles, the articles having perimeters that define shapes able to form a tessellated pattern.

8 Claims, 4 Drawing Sheets

(56) References Cited

U.S. PATENT DOCUMENTS

| | | |
|---|---|---|
| 4,180,558 A | 12/1979 | Goldberg et al. |
| 4,286,016 A | 8/1981 | Dimond et al. |
| 4,287,219 A | 9/1981 | Fabre |
| 4,315,965 A | 2/1982 | Mason et al. |
| 4,342,813 A | 8/1982 | Erickson |
| 4,349,531 A | 9/1982 | Mlodozeniec et al. |
| 4,377,615 A | 3/1983 | Suzuki et al. |
| 4,397,391 A | 8/1983 | Cornelissens |
| 4,415,617 A | 11/1983 | D'Elia |
| 4,639,390 A | 1/1987 | Shoji |
| 4,892,758 A | 1/1990 | Serbiak et al. |
| 4,923,660 A | 5/1990 | Willenberg et al. |
| 5,041,252 A | 8/1991 | Fujii et al. |
| 5,110,678 A | 5/1992 | Narukawa et al. |
| 5,120,888 A | 6/1992 | Nohr et al. |
| 5,135,804 A | 8/1992 | Harpell et al. |
| 5,158,810 A | 10/1992 | Oishi et al. |
| 5,208,104 A | 5/1993 | Ueda et al. |
| 5,230,853 A | 7/1993 | Colegrove et al. |
| 5,246,603 A | 9/1993 | Tsaur |
| 5,342,335 A | 8/1994 | Rhim |
| 5,362,532 A | 11/1994 | Famili et al. |
| 5,364,627 A | 11/1994 | Song |
| 5,387,147 A | 2/1995 | Ohshima et al. |
| 5,429,874 A | 7/1995 | Vanputte |
| 5,455,114 A | 10/1995 | Qhmory et al. |
| 5,470,424 A | 11/1995 | Isaac et al. |
| 5,470,653 A | 11/1995 | Honeycutt et al. |
| 5,486,418 A | 1/1996 | Qhmory et al. |
| 5,518,730 A | 5/1996 | Fuisz |
| 5,520,924 A | 5/1996 | Chapman et al. |
| 5,538,735 A | 7/1996 | Ahn |
| 5,585,059 A | 12/1996 | Kobayashi et al. |
| 5,651,987 A | 7/1997 | Fuisz |
| 5,691,015 A | 11/1997 | Tsukamoto et al. |
| 5,705,183 A | 1/1998 | Phillips et al. |
| 5,716,692 A | 2/1998 | Warner et al. |
| 5,717,026 A | 2/1998 | Ikimine et al. |
| 5,735,812 A | 4/1998 | Hardy |
| 5,780,418 A | 7/1998 | Niinaka et al. |
| 5,827,586 A | 10/1998 | Yamashita et al. |
| 5,840,423 A | 11/1998 | Sano et al. |
| 5,863,887 A | 1/1999 | Gillette |
| 5,879,493 A | 3/1999 | Johnson et al. |
| 5,911,224 A | 6/1999 | Berger |
| 5,914,124 A | 6/1999 | Mahoney et al. |
| 5,942,179 A | 8/1999 | Tailentire et al. |
| 6,008,181 A | 12/1999 | Cripe |
| 6,037,319 A | 3/2000 | Dickler et al. |
| 6,066,396 A | 5/2000 | Inada et al. |
| 6,080,346 A | 6/2000 | Jack |
| 6,130,193 A | 10/2000 | Gillette |
| 6,175,054 B1 | 1/2001 | Jacques |
| 6,197,238 B1 | 3/2001 | Wang et al. |
| 6,207,274 B1 | 3/2001 | Ferenc et al. |
| 6,274,162 B1 | 8/2001 | Steffenino et al. |
| 6,319,510 B1 | 11/2001 | Yates |
| 6,406,797 B1 | 6/2002 | Vanputte |
| 6,420,625 B1 | 7/2002 | Jones et al. |
| 6,448,462 B2 | 9/2002 | Groitzsch et al. |
| 6,465,407 B2 | 10/2002 | Hayashi et al. |
| 6,552,123 B1 | 4/2003 | Katayama et al. |
| 6,576,575 B1 | 6/2003 | Griesbach, III et al. |
| 6,608,121 B2 | 8/2003 | Isozaki et al. |
| 6,657,004 B2 | 12/2003 | Mizutani |
| 6,699,826 B1 | 3/2004 | Saijo |
| 6,730,648 B2 | 5/2004 | Gorlin et al. |
| 6,783,852 B2 | 8/2004 | Inada et al. |
| 6,787,512 B1 | 9/2004 | Verrail et al. |
| 6,808,598 B1 | 10/2004 | Takeuchi et al. |
| 6,818,606 B1 | 11/2004 | Hanada et al. |
| 6,898,921 B2 | 5/2005 | Duffield |
| 6,949,498 B2 | 9/2005 | Murphy et al. |
| 6,956,070 B2 | 10/2005 | Fujiwara et al. |
| 6,977,116 B2 | 12/2005 | Cabell et al. |
| 7,026,049 B2 | 4/2006 | Endo et al. |
| 7,041,628 B2 | 5/2006 | Sunder |
| 7,067,575 B2 | 6/2006 | Kitamura et al. |
| 7,083,047 B2 | 8/2006 | Bone et al. |
| 7,094,744 B1 | 8/2006 | Kobayashi et al. |
| 7,115,551 B2 | 10/2006 | Hasenorhrl et al. |
| 7,169,740 B2 | 1/2007 | Sommerville-Roberts et al. |
| 7,196,026 B2 | 3/2007 | Di Luccio et al. |
| RE39,557 E | 4/2007 | Moe |
| 7,226,899 B2 | 6/2007 | Cole et al. |
| 7,285,520 B2 | 10/2007 | Krzysik et al. |
| 7,387,787 B2 | 6/2008 | Fox |
| 7,407,669 B2 | 8/2008 | Leung et al. |
| 7,429,273 B2 | 9/2008 | DeDominicis et al. |
| 7,446,084 B2 | 11/2008 | Barthel et al. |
| 7,491,407 B2 | 2/2009 | Pourdeyhimi et al. |
| 7,507,698 B2 | 3/2009 | Franzolin et al. |
| 7,547,737 B2 | 6/2009 | Kochvar et al. |
| 7,563,757 B2 | 7/2009 | Kouvroukoglou et al. |
| 7,708,840 B2 | 5/2010 | Wiedemann et al. |
| 7,727,946 B2 | 6/2010 | Catalfamo et al. |
| 7,824,588 B2 | 11/2010 | Yang et al. |
| 7,856,989 B2 | 12/2010 | Karies et al. |
| 7,967,801 B2 | 6/2011 | Hammons et al. |
| 8,338,358 B2 | 12/2012 | Bernhardt |
| 8,349,232 B2 | 1/2013 | Pourdeyhimi et al. |
| 8,785,361 B2 | 7/2014 | Sivik |
| 9,074,305 B2 | 7/2015 | Glenn, Jr. |
| 9,163,205 B2 | 10/2015 | Sivik |
| 9,175,250 B2 | 11/2015 | Sivik |
| 9,267,095 B2 | 2/2016 | Delaney |
| 9,421,153 B2 | 8/2016 | Sivik |
| 9,480,628 B2 | 11/2016 | Sivik |
| 9,493,726 B2 | 11/2016 | Vinson |
| 9,796,948 B2 | 10/2017 | Shearouse |
| 10,045,915 B2 | 8/2018 | Glenn, Jr. |
| 2001/0037851 A1 | 11/2001 | Mortellite et al. |
| 2002/0013251 A1 | 1/2002 | Hayashi |
| 2002/0018906 A1 | 2/2002 | Clark |
| 2002/0098994 A1 | 7/2002 | Zafar |
| 2002/0161088 A1 | 10/2002 | Kochvar et al. |
| 2002/0173213 A1 | 11/2002 | Chu et al. |
| 2003/0017208 A1 | 1/2003 | Ignatious et al. |
| 2003/0045446 A1 | 3/2003 | Dihora et al. |
| 2003/0166495 A1 | 9/2003 | Wang et al. |
| 2003/0185872 A1 | 10/2003 | Kochinke |
| 2003/0216098 A1 | 11/2003 | Carlyle |
| 2003/0224959 A1 | 12/2003 | Smith |
| 2004/0129032 A1 | 7/2004 | Severns |
| 2004/0167256 A1 | 8/2004 | Verrall et al. |
| 2004/0170836 A1 | 9/2004 | Bond et al. |
| 2004/0180597 A1 | 9/2004 | Kamada et al. |
| 2004/0204543 A1 | 10/2004 | Yang |
| 2005/0003048 A1 | 1/2005 | Pearce et al. |
| 2005/0003980 A1 | 1/2005 | Baker |
| 2005/0003991 A1 | 1/2005 | MacQuarrie |
| 2005/0008776 A1 | 1/2005 | Chhabra et al. |
| 2005/0010010 A1 | 1/2005 | Kitamura et al. |
| 2005/0136112 A1 | 6/2005 | Gonzales et al. |
| 2005/0136780 A1 | 6/2005 | Clark et al. |
| 2005/0186256 A1 | 8/2005 | Dihel et al. |
| 2005/0209574 A1 | 9/2005 | Boehringer et al. |
| 2005/0281757 A1 | 12/2005 | Ibrahim et al. |
| 2006/0013869 A1 | 1/2006 | Ignatious et al. |
| 2006/0035042 A1 | 2/2006 | Morken |
| 2006/0083784 A1 | 4/2006 | Ignatious et al. |
| 2006/0111261 A1 | 5/2006 | Sadlowski |
| 2006/0127458 A1 | 6/2006 | Kiser et al. |
| 2006/0134412 A1 | 6/2006 | Mackey et al. |
| 2006/0160453 A1 | 7/2006 | Suh |
| 2006/0189772 A1 | 8/2006 | Scheibel et al. |
| 2006/0205628 A1 | 9/2006 | Deinhammer |
| 2006/0254013 A1 | 11/2006 | Konishi et al. |
| 2006/0254014 A1 | 11/2006 | Konishi et al. |
| 2006/0258251 A1 | 11/2006 | Konishi et al. |
| 2006/0264130 A1 | 11/2006 | Karles et al. |
| 2007/0054579 A1 | 3/2007 | Baker et al. |
| 2007/0110792 A9 | 5/2007 | Simon |
| 2007/0128256 A1 | 6/2007 | Aubrun-Sonneville |

(56) References Cited

U.S. PATENT DOCUMENTS

| | | |
|---|---|---|
| 2007/0134304 A1 | 6/2007 | Aubrun-Sonneville et al. |
| 2007/0134481 A1 | 6/2007 | Aubrun-Sonneville |
| 2007/0253926 A1 | 11/2007 | Tadrowski et al. |
| 2007/0259170 A1 | 11/2007 | Brown et al. |
| 2007/0259996 A1 | 11/2007 | Vicari et al. |
| 2007/0298064 A1 | 12/2007 | Koslow |
| 2008/0035174 A1 | 2/2008 | Aubrun-Sonneville et al. |
| 2008/0108748 A1 | 5/2008 | Buckley et al. |
| 2008/0118727 A1 | 5/2008 | Andersen |
| 2008/0146481 A1 | 6/2008 | Brown et al. |
| 2008/0149119 A1 | 6/2008 | Marquez et al. |
| 2008/0220054 A1 | 9/2008 | Shastri et al. |
| 2008/0226919 A1 | 9/2008 | Hosoda et al. |
| 2008/0242572 A1 | 10/2008 | Icht et al. |
| 2008/0269095 A1 | 10/2008 | Aubrun-Sonneville |
| 2009/0004254 A1 | 1/2009 | Maibach |
| 2009/0041820 A1 | 2/2009 | Wu et al. |
| 2009/0061496 A1 | 3/2009 | Kuhn et al. |
| 2009/0061719 A1 | 3/2009 | Shibutani et al. |
| 2009/0155326 A1 | 6/2009 | Mack et al. |
| 2009/0001815 A1 | 7/2009 | Kang et al. |
| 2009/0002495 A1 | 10/2009 | Fileccia et al. |
| 2009/0285718 A1 | 11/2009 | Privitera et al. |
| 2009/0291282 A1 | 11/2009 | Kitamura et al. |
| 2010/0018641 A1 | 1/2010 | Branham et al. |
| 2010/0021517 A1 | 1/2010 | Ahlers et al. |
| 2010/0105821 A1 | 4/2010 | Verrall et al. |
| 2010/0166854 A1 | 7/2010 | Michniak-Kohn |
| 2010/0196440 A1 | 8/2010 | Stark et al. |
| 2010/0266668 A1 | 10/2010 | Coffee et al. |
| 2010/0279905 A1 | 11/2010 | Glenn, Jr. et al. |
| 2010/0285101 A1 | 11/2010 | Moore et al. |
| 2011/0136719 A1 | 6/2011 | Jalbert et al. |
| 2011/0159267 A1 | 6/2011 | Lee et al. |
| 2011/0223381 A1 | 9/2011 | Mackey et al. |
| 2011/0230112 A1 | 9/2011 | Rosé et al. |
| 2011/0301070 A1 | 12/2011 | Qchomogo et al. |
| 2012/0021026 A1 | 1/2012 | Chhabra et al. |
| 2012/0027838 A1 | 2/2012 | Gordon |
| 2012/0048769 A1 | 3/2012 | Sivik et al. |
| 2012/0052036 A1 | 3/2012 | Glenn, Jr. |
| 2012/0053103 A1 | 3/2012 | Sivik et al. |
| 2012/0053108 A1 | 3/2012 | Glen, Jr. et al. |
| 2012/0058166 A1 | 3/2012 | Glenn, Jr. |
| 2012/0082037 A1 | 3/2012 | Sivik et al. |
| 2012/0154300 A1 | 6/2012 | Ma |
| 2012/0172831 A1 | 7/2012 | Darcy et al. |
| 2012/0215148 A1 | 8/2012 | Ewert et al. |
| 2012/0237576 A1 | 9/2012 | Gordon |
| 2013/0171421 A1 | 7/2013 | Weisman et al. |
| 2013/0172226 A1 | 7/2013 | Dreher et al. |
| 2014/0287973 A1 | 9/2014 | Sivik et al. |
| 2014/0366294 A1 | 12/2014 | Roe |
| 2015/0048001 A1 | 2/2015 | Bailey |
| 2015/0104856 A1 | 4/2015 | Astrid |
| 2015/0313807 A1 | 11/2015 | Lynch |
| 2016/0010041 A1 | 1/2016 | Sivik |
| 2016/0040105 A1 | 2/2016 | Depoot et al. |
| 2016/0101204 A1 | 4/2016 | Lynch |
| 2016/0186095 A1 | 6/2016 | Vockenroth |
| 2016/0200501 A1 | 7/2016 | Lee |
| 2016/0271021 A1 | 9/2016 | Glenn, Jr. |
| 2016/0340624 A1 | 11/2016 | Sivik |
| 2016/0374906 A1 | 12/2016 | Sivik |
| 2017/0009191 A1 | 1/2017 | Maes |
| 2017/0067002 A1 | 3/2017 | Cumming |
| 2017/0164612 A1 | 6/2017 | Ripberger |
| 2017/0320105 A1 | 11/2017 | Roozrokh |
| 2018/0223229 A1 | 8/2018 | Tan |
| 2018/0338890 A1 | 11/2018 | Glenn, Jr. |

FOREIGN PATENT DOCUMENTS

| | | | |
|---|---|---|---|
| DE | 10 2007 011606 A1 | 9/2008 | |
| EP | 1 275 368 A1 | 1/2003 | |
| EP | 1 306 425 A2 | 5/2003 | |
| EP | 1 409 628 B1 | 2/2006 | |
| EP | 1 512 701 B1 | 6/2006 | |
| EP | 1 887 036 A2 | 2/2008 | |
| EP | 1 888 036 | 2/2008 | |
| EP | 1 436 376 B1 | 4/2010 | |
| EP | 2 226 379 A1 | 9/2010 | |
| EP | 1 948 771 B1 | 12/2010 | |
| EP | 2 319 965 A1 | 5/2011 | |
| EP | 2 363 432 A1 | 9/2011 | |
| EP | 2 363 517 A1 | 9/2011 | |
| EP | 2 395 142 A1 | 12/2011 | |
| GB | 2107579 A | 5/1993 | |
| GB | 2375542 | 11/2002 | |
| GB | 2449418 | 11/2008 | |
| HU | 221299 B1 | 9/2002 | |
| JP | 62-156348 | 7/1987 | |
| JP | 3040879 A | 2/1991 | |
| JP | 3101618 A | 4/1991 | |
| JP | 09279457 | 10/1997 | |
| JP | 10008364 | 1/1998 | |
| JP | 10158700 A | 6/1998 | |
| JP | 2000169896 A | 6/2000 | |
| JP | 2009079329 | 4/2009 | |
| WO | WO 1992/006603 A1 | 4/1992 | |
| WO | WO 1994/002377 A1 | 2/1994 | |
| WO | WO 94/04656 A2 | 3/1994 | |
| WO | WO 95/23888 A1 | 9/1995 | |
| WO | WO 99/57155 | 11/1999 | |
| WO | WO 2000/013680 A2 | 3/2000 | |
| WO | WO0027958 A1 | 5/2000 | |
| WO | WO 01/25322 A1 | 4/2001 | |
| WO | WO 2001/54667 A1 | 8/2001 | |
| WO | WO 03/060007 A1 | 7/2003 | |
| WO | WO 2004/009335 A1 | 1/2004 | |
| WO | WO 2004/081162 A1 | 9/2004 | |
| WO | WO 2005/068604 A1 | 7/2005 | |
| WO | WO 2006/106514 A2 | 10/2006 | |
| WO | WO 2007/089259 A1 | 8/2007 | |
| WO | WO 2007/093558 A3 | 1/2008 | |
| WO | WO 2009/022761 A1 | 2/2009 | |
| WO | WO 2007/014221 A3 | 4/2009 | |
| WO | WO 2009/047124 * | 4/2009 | ............. C11D 17/06 |
| WO | WO2009047124 | 4/2009 | |
| WO | WO 2009/103576 A1 | 8/2009 | |
| WO | WO 2009/121900 A1 | 10/2009 | |
| WO | WO 2010/015709 A2 | 2/2010 | |
| WO | WO 2011/153023 A1 | 12/2011 | |
| WO | WO2012003367 A3 | 3/2012 | |
| WO | WO2017096354 A1 | 6/2017 | |

OTHER PUBLICATIONS

PCT Search Report for appl. No. PCT/CN2017/087707, dated Feb. 24, 2018, 12 pages.

PCT Search Report for appl. No. PCT/US2017/046391, dated Nov. 8, 2017, 17 pages.

PCT Search Report for appl. No. PCT/US2018/015357, dated Apr. 11, 2018, 14 pages.

PCT Search Report for appl. No. PCT/US2018/015358, dated Apr. 16, 2018, 15 pages.

PCT Search Report for app. No. PCT/US2019/014452, dated Apr. 8, 2019, 14 pages.

PCT Search Report for appl. No. PCT/U52019/014453, dated Apr. 8, 2019, 15 pages.

PCT Search Report for appl. No. PCT/U52019/014454, dated Apr. 5, 2019, 15 pages.

PCT Search Report for appl. No. PCT/US2019/014455, dated Apr. 5, 2019, 15 pages.

PCT Search Report for appl. No. PCT/US2019/014443, dated Apr. 17, 2019, 15 pages.

PCT Search Report for appl. No. PCT/US2019/014444, dated Apr. 16, 2019, 15 pages.

PCT Search report for appl. No. PCT/U52019/014451, dated Apr. 24, 2019, 12 pages.

PCT Search Report for appl. No. PCT/US2019/019547, dated May 22, 2019, 12 pages.

(56) References Cited

OTHER PUBLICATIONS

PCT Search Report for appl. No. PCT/US2019/049727, dated Jan. 2, 2020, 12 pages.
PCT Search report for appl. No. PCT/US2019/040240, dated Dec. 9, 2019, 15 pages.
PCT Search Report for appl. No. PCT/US19/40242, dated Oct. 22, 2019, 14 pages.
PCT Search Report for appl. No. PCT/US2019/052321, 12 pages, dated Dec. 12, 2019.
EP Search Report for appl. No. 19163586.1-1105, dated Sep. 30, 2019, 8 pages.
Search Report for appl. No. 19163588.7-1105, dated Sep. 30, 2019, 7 pages.
PCT Search Report for appl. No. PCT/CN2017/072926, dated Feb. 6, 2017, 5 pages.
PCT Search Report for appl. No. PCT/CN2017/072927, dated Feb. 6, 2017, 6 pages.
PCT Search Report for appl. No. PCT/CN2017/072935, dated Jun. 9, 2017, 4 pages.
PCT appl. No. PCT/CN2018/074281, dated Aug. 29, 2019, 7 pages.
PCT Search Report for appl. No. PCT/ CN2018/ 074282, dated Oct. 22, 2018, 5 pages.
PCT Search Report for App. No. PCT/USS2019/060216, dated Apr. 3, 2020, 14 pages.
PCT Search Report for App. No. PCT/US2020/015189, dated May 7, 2020. 15 pgs.
Makadia, et al., "Poly Lactic-co-Glycoiic Acid (PLGA) as Biodegradable Controlled Drug Delivery Carrier", Polymers, 3, pp. 1377-1397 (2011).
Smith, et al., "Nanofibrous Scaffolds and Their Biological Effects", Nantechnologies for the Life Sciences, vol. 9, pp. 188-215 (2006).
Wang, et al., "A Novel Controlled Release Drug Delivery System for Multiple Drugs Based on Electrospun Nanofibers Containing Nanoparticles", Journal of Pharmaceutical Sciences, vol. 99, No. 12 (Dec. 2010).

\* cited by examiner

WATER-SOLUBLE ARTICLES AND RELATED PROCESSES

This application claims benefit to Provisional Serial No. 62/622,159, filed on Jan. 26, 2018.

FIELD OF THE INVENTION

The present disclosure relates to water-soluble unit dose articles and processes for making such articles. The articles each include at least a first ply that includes a plurality of fibrous elements. The articles may each include a perimeter that defines a shape in an X-Y plane, where the shapes defined by the perimeters are able to form a tessellated pattern.

BACKGROUND OF THE INVENTION

Providing consumer products in water-soluble unit dose form is becoming increasingly popular, in part due to the convenient, no-mess form. In particular, water-soluble articles that include fibrous elements may be particularly advantageous. For example, active agents can be loaded into or onto the fibrous elements themselves, be entangled with them, be coated onto the elements, or deposited onto a ply made from such elements. Further, articles may include two or more plies, which can increase the flexibility and/or effectiveness of the form. Additionally, articles made from fibrous elements may have a relatively content of the active ingredient(s), content, as water or other solvents may not be required at significant levels.

Articles made from fibrous elements may be made by providing a web of material that includes the fibrous elements and then cutting the web to form the elements. However, such a process can create significant waste, as material between the resulting articles is thrown away. Because the articles (and the parent web) are high in actives, such waste can be particularly costly to the manufacturer. When the web includes multiple plies of material, the waste is multiplied accordingly. Additionally, there may be significant variations in the basis weight of the web, particular between the edges and the middle portion of the web, which can lead to inconsistent quality in articles made from such webs. The portions having the most variation may be removed and/or discarded, but this puts even more pressure on the manufacturer to be as efficient as possible.

Even once the articles have been made, the manufacturer is under pressure to pack and ship them efficiently due to the three-dimensional character and/or irregular shapes of the articles, whereas the manufacturer of a liquid or powder product can simply pour the product into a container and seal it.

There is a need to improve water-soluble articles and related manufacturing processes to address one or more of the problems provided above.

SUMMARY OF THE INVENTION

The present disclosure relates to water-soluble unit dose articles and processes for making such articles.

For example, the present disclosure relates to a plurality of water-soluble unit dose articles, each article comprising at least a first ply, the first ply comprising a plurality of fibrous elements, each fibrous element comprises at least one filament-forming material and optionally a surfactant; where the unit dose articles each include a perimeter that defines a shape in an X-Y plane, where the shapes defined by the perimeters are able to form a tessellated pattern.

The present disclosure also relates to a process of making a plurality of water-soluble unit dose articles, where the process includes the steps of providing a water-soluble web and cutting the web in a tessellated pattern to form a plurality of water-soluble unit dose articles. The web may include a plurality of fibrous elements, each fibrous element comprises at least one filament-forming material and optionally a surfactant.

BRIEF DESCRIPTION OF THE DRAWINGS

The figures herein are illustrative in nature and are not intended to be limiting.

DETAILED DESCRIPTION OF THE INVENTION

The present disclosure relates to water-soluble unit dose articles and methods of making such articles. In particular, the present disclosure relates to water-soluble unit dose articles that have perimeters defining shapes that can form a tessellated pattern. Articles in such shapes can be efficiently manufactured, packed, shipped, and/or displayed. Additionally, the processes of the present disclosure relate to efficiently manufacturing such articles, for example by cutting a web in a tessellated pattern.

As used herein, the term "tessellated" is used in the sense that a surface, for example a planar surface, can be covered or tiled by the shape or shapes in question. The shapes can fit together like a jigsaw to form a continuous tiled planar surface with no substantial gaps or overlays, except for optional gaps at the edges of the (planar) surface. The shapes may be shaped to nest and/or interlock with one another, or they may be capable of simply being adjacent to each other with no significant gaps or overlay. Shapes that may be tessellated include square, rectanglar, kite-like, and hexagonal shapes. Other shapes may include relatively concave portions that may be shaped to receive relatively convex portions of another (same or different) shape. Shapes of different sizes and/or perimeter shapes may be combined to form a tessellated pattern. The artist M. C. Escher is well-known for creating complex tessellated designs that include repeating patterns of the shapes of, e.g., fish, birds, and/or geometric shapes.

The articles and processes are described in more detail below.

As used herein, "tessellated" and "tiled" (including derivations of each word, such as "tessellatable" and/or "tilable") may be used interchangeably.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, the phrase "water-soluble" means a material that is miscible in water. In other words, it means a material that is capable of forming a stable (does not separate for greater than 5 minutes after forming the homogeneous solution) homogeneous solution with water at ambient conditions. As used herein, "ambient conditions" as used herein means 23° C.±1.0° C. and a relative humidity of 50%±2%.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Water-Soluble Unit Dose Articles

The present disclosure relates to water-soluble unit dose articles, including a plurality of such articles. The articles may include perimeters that are shaped to be able to form a tessellated pattern.

Articles of the present disclosure may be useful for treating a surface. Suitable surfaces to be treated may include hard surfaces (i.e., kitchen countertops, bath tubs, toilets, toilet bowls, sinks, floors, walls, teeth, cars, windows, mirrors, dishes) and/or soft surfaces (i.e., fabric, hair, skin, carpet, crops, plants).

The article 1 may be a consumer product, such as a product useful for household care and/or personal care. Household care products may include fabric care compositions and hard surface care compositions, including dish care compositions. Personal care products may include hair care compositions, oral care compositions, and skin care compositions.

Figure 1:
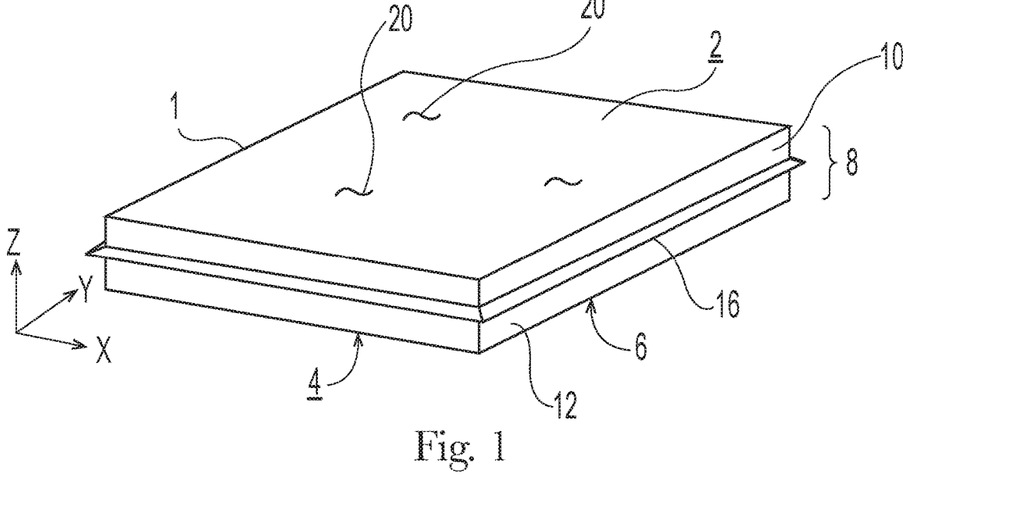
FIG. 1 shows a perspective view of a water-soluble unit dose article according to the present disclosure.

FIG. 1 shows a perspective view of a representative water-soluble unit dose article 1. The article 1 may include a first surface 2 and a second surface 4 that is opposite the first surface 2. The first surface 2 and/or the second surface 4 may each be independently substantially planar in an X-Y plane. The article 1 as a whole may be substantially planar, e.g., in the X-Y plane. The X-Y plane may be determined as the plane of the article having the first and second largest dimensions (e.g, the longest and widest dimensions).

The article 1 may have a perimeter 6 in an X-Y plane. The article may have a thickness 8 in a Z direction, where the Z direction is orthogonal to the X-Y plane.

The article 1 may include at least a first ply 10. The first ply comprises a plurality of fibrous elements 20. As described in more detail below, the fibrous elements may comprise at least one filament-forming material and optionally a surfactant. The article 1 may include no more than one ply.

The article may include a second ply 12. The first ply 10 may be joined to the second ply 12. Although not shown in FIG. 1, the article 1 may include a third ply 14 or even additional plies.

The article 1 may include a flange 16. The flange 16 may be located at the perimeter 6 of the article 1. The flange 16 may be continuous or discontinuous around the article 1, preferably continuous. The flange 16 may be a remnant of the manufacturing process, for example, from where the article 1 was cut from a web 100. Additionally, or alternatively, the flange 16 may be an edge seal where a first ply 10 is joined with at least a second ply 12.

The flange 16/edge seal can have an edge seal breadth of from about 0.5 mm to about 4 mm or any value therebetween. Thus, in certain examples, the edge seal can have an edge seal breadth from about 0.8 mm to about 3.5 mm; from about 1 mm to about 3 mm; from about 1.2 mm to about 2.8 mm; from about 1.5 mm to about 2.5 mm; or from about 1.6 mm to about 2 mm. In one example, the edge seal can have an edge seal breadth of about 1.7 mm. Edge seal breadth measurements are taken in accordance with the Edge Seal Breadth Test Method described herein.

Articles 1 according to the present disclosure may exhibit a basis weight of less than 5000 g/m$^2$ as measured according to the Basis Weight Test Method described herein. The article 1 may exhibit a basis weight of greater than 10 g/m$^2$ to about 5000 g/m$^2$ and/or greater than 10 g/m$^2$ to about 3000 g/m² and/or greater than 10 g/m² to about 2000 g/m² and/or greater than 10 g/m² to about 1000 g/m² and/or greater than 20 g/m² to about 800 g/m² and/or greater than 30 g/m² to about 600 g/m² and/or greater than 50 g/m² to about 500 g/m² and/or greater than 300 g/m² to about 3000 g/m² and/or greater than 500 g/m² to about 2000 g/m² as measured according to the Basis Weight Test Method.

Figure 2:
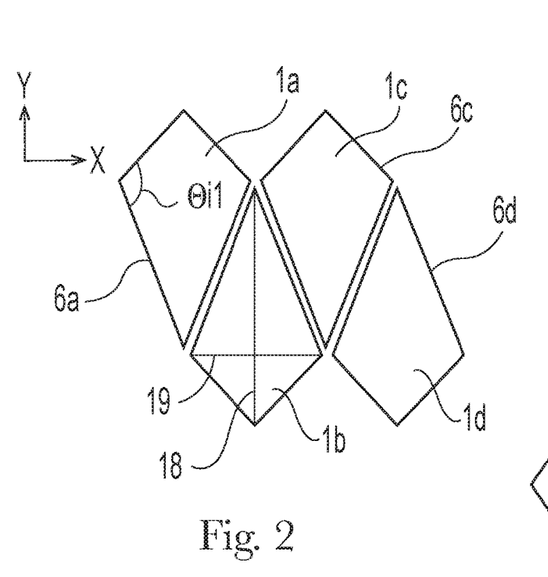
FIG. 2 shows a top view of a plurality of water-soluble unit dose articles according to the present disclosure.

FIG. 2 shows a top view of a plurality of water-soluble unit dose articles 1a, 1b, 1c, 1d according to the present disclosure. In FIG. 2, a first article 1a is shown in a tessellated pattern with a second article 1b, a third article 1c, and a fourth article 1d. Each article 1a, 1b, 1c, 1d includes a perimeter 6a, 6b, 6c, 6d. The tessellated pattern of the plurality of water-soluble unit dose articles 1a, 1b, 1c, 1d is slightly exploded to more clearly show the articles 1a, 1b, 1c, 1d and the shapes defined by their respective perimeters 6a, 6b, 6c, 6d. The articles 1a, 1b, 1c, 1d are shaped to lie adjacent to each other in a tessellated pattern without necessarily nesting or interlocking.

The first article 1a has a perimeter 6a that defines a shape that, although quadrilateral, is non-rectangular. Instead, the perimeter 6a of the first article 1a defines a shape that may be described as a "kite" (e.g., a shape formed by the outline of two non-congruent isosceles triangles sharing a common base). The shape defined by perimeter 6a does not include a concave portion. The shape defined by perimeter 6a includes at least one internal angle θi1 that is greater than 90°.

Although the articles 1a, 1b, 1c, 1d of FIG. 2 have relatively sharp corners, the corners and/or other edges of articles of the present disclosure may be somewhat rounded and still be considered as having tessellatable shapes. For example, articles may still be considered as having tessellated shapes if, when placed on a surface in the most efficiently tessellated arrangement possible, no more than 10%, or no more than 5%, or no more than 3% of the surface area of the underlying surface is visible between the articles.

As shown in FIG. 2, two or more of the articles 1a, 1b, 1c, 1d in the plurality of articles may be of the same size and/or have perimeters 6a, 6b, 6c, 6d that define the same shape.

As shown in exemplary fashion in the second article 1b, each article may be characterized by a length 18, where the length 18 is defined as the greatest dimension of the article 1b in the X-Y plane. Each article may be characterized by a width 19, where the width 19 is defined as the greatest dimension in a direction that is in the X-Y plane and is orthogonal to the length 18.

The article 1 may be sized and dimensioned to be conveniently held or otherwise handled in a one-handed fashion by an adult. The article may have no dimension greater than 20, or no greater than 18 cm, or not greater than 15 cm, or no greater than 12 cm, or no greater than 10 cm, as it is believed that larger dimensions may be difficult to handle and/or remove from a container.

The article 1 may have a length 18 of from about 1 cm, or from about 2 cm, or from about 3 cm, or from about 4 cm, or from about 5 cm, to about 20 cm, or to about 18 cm, or to about 15 cm, or to about 12 cm, or to about 8 cm. The article 1 may have length 18 of from about 5 cm to about 10 cm.

The article 1 may have a width 19 of from about 1 cm, or from about 2 cm, or from about 3 cm, or from about 4 cm, to about 12 cm, or to about 10 cm, or to about 8 cm. The article 1 may have a width 19 of from about 4 cm to about 8 cm.

A ratio of a length 18 of an article 1 to its width 19 can be from about 3:1 to about 1:1; from about 5:2 to about 1:1; or from about 2:1 to about 1:1; or from about 3:2 to about 1:1.

The article 1 can have a height, or thickness 8, from about 1 mm, or from about 2 mm, or from about 3 mm, to about 20 mm, or to about 15 mm, or to about 10 mm, or to about 7 mm. The thickness 8 may be less than about 20%, or less than about 10%, or less than about 5% of the length. The thickness 8 may be at least about 1%, or at least about 3%, or at least about 5%, of the length 18. Height, or thickness 8, measurements are taken in accordance with the Thickness Test Method described herein.

As mentioned above, the article 1 may have a perimeter 6 in an X-Y plane. The flange 16 may substantially parallel the perimeter 6. Because the flange 16 may be where multiple plies 10, 12 are joined together, the seal area and/or flange 16 may suffer from dissolution challenges. Therefore, it may be preferred to select articles 1 that have shapes with relatively minimal perimeters.

That being said, it is still important to maximize the size of the article 1 (e.g., in order to deliver a desired amount of active agents) and/or select shapes that are tessellateable (e.g., in order to efficiently manufacture the articles). The area of the shape defined by the perimeter 6 of the article 1 can be used as a proxy for the size of the article. Thus, it may be advantageous to select an article shape having a desirable ratio of perimeter 6 to area of the shape defined by the perimeter 6.

For example, the article 1 may have a length 18 (i.e., the longest dimension) of no greater than 15 cm, or no greater than 12 cm, or no greater than 10 cm, optionally a width of no less than 3 cm, no less than 4 cm, or no less than 5 cm, or no less than 6 cm, and a ratio of the perimeter to the area of the shape defined by the perimeter ("perimeter:area ratio") in the range of from 3:10/cm, or from 4:10/cm, to no greater than 12:10/cm, or no greater than 10:10/cm, or no greater than 8:10/cm, or no greater than 6:10/cm. By way of example, an article having a perimeter in the shape of a square that is 10 cm on each side has a perimeter of 40 cm, an area of 100 cm², and a perimeter:area ratio of 0.4/cm (40 cm/100 cm²=4:10/cm, or 0.4/cm). Without wishing to be bound by theory, when the perimeter:area ratio is too high (e.g., above 1.2/cm), such as for relatively small articles, it is believed that there is relatively too much perimeter/edge seal for the size of the article, meaning that the dissolution issues may overshadow the performance benefits. When the perimeter:area ratio is too low (e.g., less than 0.3/cm, or less than 0.4/cm), the article may become too unwieldy to conveniently handle; in short, it may be too large for a convenient unit dose operation. For similar reasons, it may be desirable to cap the length at a maximum (e.g., less than 20, less than 18, less than 15, less than 12 cm) so that the article may be conveniently used.

The article can have a volume of from about 0.25 cubic centimeters (cc) to about 60 cc; from about 0.5 cc to about 60 cc; from about 0.5 cc to about 50 cc; from about 1 cc to about 40 cc; from about 1 cc to about 30 cc; from about 2 cc to about 20 cc; from about 3 cc to about 20 cc; from about 4 cc to about 15 cc; or from about 4 cc to about 10 cc. In certain examples, the article can have a volume of from about 3 cc to about 6 cc. In other examples, the article can have a volume of from about 20 cc to about 35 cc; or from about 24 cc to about 30 cc.

The article can have a mass of about 50 g or less; about 40 g or less; about 30 g or less; about 25 g or less; about 20 g or less; about 15 g or less; about 10 g or less; about 7.5 g or less; about 5 g or less; about 4 g or less; about 3 g or less; about 2 g or less; about 1.5 g or less; about 1.25 g or less; about 1 g or less; about 0.75 g or less; or about 0.5 g or less. In certain examples, the article can have a mass of from about 0.25 g to about 50 g; from about 0.25 g to about 40 g; from about 0.25 g to about 30 g; from about 0.25 g to about 25 g; from about 0.25 g to about 20 g; from about 0.5 g to about 15 g; from about 0.5 g to about 10 g; from about 0.5 to about 5 g; from about 0.5 g to about 4 g; from about 0.5 g to about 3 g; from about 0.5 g to about 2.5 g; or from about 1 g to about 2 g. In certain examples, the article can have a mass of from about 5 g to about 15 g; or from about about 8 g to about 12 g.

Figure 3:
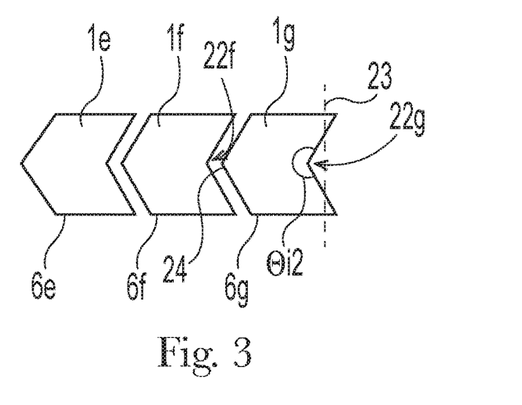
FIG. 3 shows a top view of a plurality of water-soluble unit dose articles according to the present disclosure.

FIG. 3 shows a top view of a plurality of water-soluble unit dose articles 1e, 1f, 1g. Each of the articles 1e, 1f, 1g includes a perimeter 6e, 6f, 6g, where the perimeters define shapes that are able to form a tessellated pattern. As shown on article 1g, the shape defined by perimeter 6g may comprise a concave portion 22. A shape has a concave portion if a line 23 can be drawn and intersect the shape defined by the perimeter 6g at more than two points.

The shape defined by the perimeter 6g may include at least one internal angle θi2 that is greater than 180° but less than 360°.

The shape defined by the perimeter 6g may include at least one convex portion 24, which may be sized and configured to nest or interlock with a concave portion 22f of an adjacent article 1f. Additionally, or alternatively, a convex portion 24 may nest or interlock with a relatively concave portion formed in combination by two or more articles.

Figure 4:
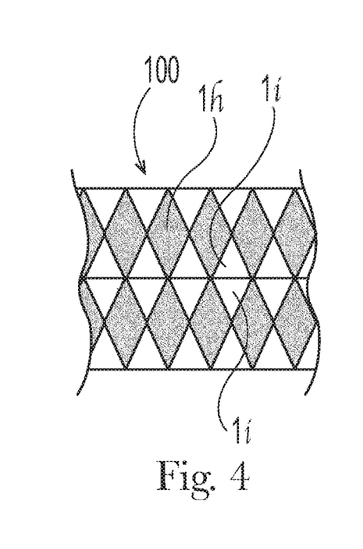
FIG. 4 shows a web cut in a tessellated pattern.

FIG. 4 shows a top view of a plurality of water-soluble unit dose articles 1h, 1i, 1j in a tessellated pattern. The articles 1h, 1i, 1j may be of different sizes and/or shapes. For example, in FIG. 4, article 1h is relatively larger than, for example, articles 1i and 1j. It may be that the area of the shape defined by the perimeter 6h of article 1h is greater than the area of the shape defined by perimeters 6i and 6j of articles 1i and 1j, respectively. It may be that the mass of article 1h is greater than the mass of article 1i or article 1j.

Additionally, the articles 1h, 1i, and 1j are in different shapes. Specifically, article 1h is in the shape of a diamond, whereas articles 1i and 1j are both in the shape of triangles.

FIG. 4 also shows that articles 1h, 1i, and 1j having different sizes and/or shapes may be cut from the same web 100. Providing articles 1h, 1i, 1j of different sizes and/or shapes may be useful to the consumer because, e.g., they allow for dosing flexibility that unitized dose articles of the same shape/size do not provide. Furthermore, cutting tessellatable articles 1h, 1i, 1j of different sizes and/or shapes from the same web 100 may be advantageous to the manufacturer because the articles may be manufactured simultaneously on a single manufacturing line.

Further, it allows the manufacturer to use a single cutting apparatus, saving capital and/or change-over time.

Figure 5:
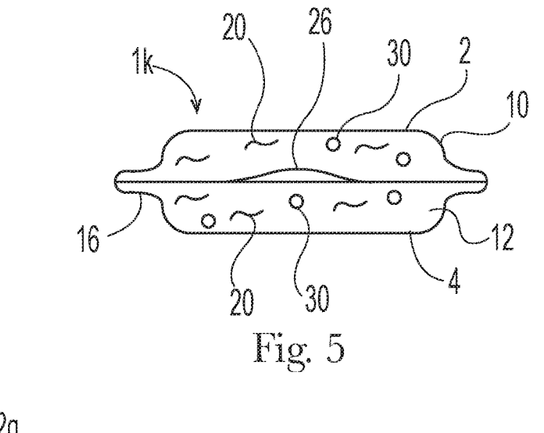
FIG. 5 shows a cross-sectional view of a unit dose article according to the present disclosure, the article having two plies.

FIG. 5 shows a cross-section of a water-soluble unit dose article 1k according to the present disclosure. The article 1k includes a first ply 10 and a second ply 12. The article 1k includes a flange 16 where the first and second plies 10, 12 are joined. Each ply 10, 12 includes a plurality of fibrous elements 20. One or both plies 10, 12 may also include a plurality of particles 30. The article 1k may include an interior region 26 where the first ply 10 faces the second ply 12. The interior region 26 may be in the form of a cavity and may include active ingredients. Additionally, or alternatively, the interior region 26 may be where the first ply 10 contacts the second ply 12. Active ingredients may be applied to one or both plies 10, 12 in a manner, for example as a coating, so as to be located in the interior region 26 of the article 1k.

Figure 6:
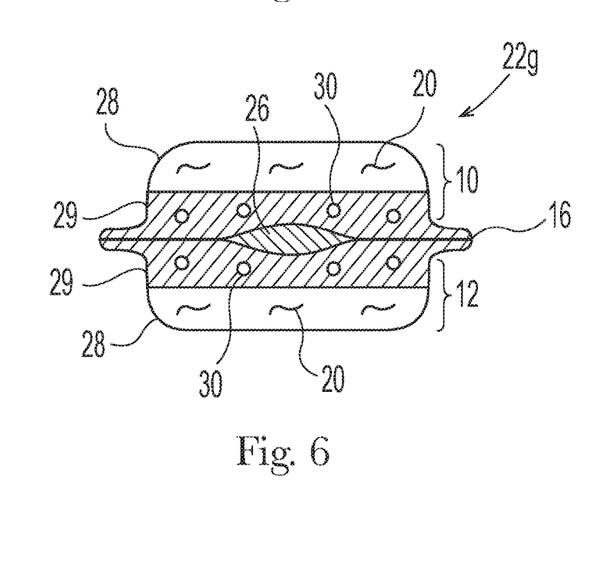
FIG. 6 shows a cross-sectional view of a unit dose article according to the present disclosure, the article having two plies, where each ply includes two layers.

FIG. 6 shows a cross-section of a water-soluble unit dose article 1L according to the present disclosure. The article 1L includes a first ply 10 and a second ply 12. One or both plies 10, 12 may include more than one layer, for example a first layer 28 and a second layer 29. The first layer 28 may face the exterior environment. The second layer 29 may face the interior region 26. At least one of the layers, for example the first layer 28, may comprise the plurality of fibrous elements 20. Each layer 28, 29 may comprise the plurality of fibrous elements 20. At least one of the layers, for example the second layer 29, may comprise a plurality of particles 30.

Figure 7:
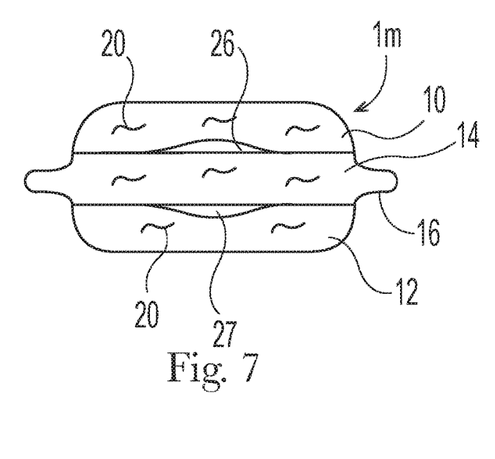
FIG. 7 shows a cross-sectional view of a unit dose article according to the present disclosure, the article having three plies.

FIG. 7 shows a cross-section of a water-soluble unit dose article 1m according to the present disclosure. The article 1m include a first ply 10, a second ply 12, and a third ply 14. Each ply 10, 12, 14 includes a plurality of fibrous elements 20. As shown in FIG. 7, the article 1m may include interior regions 26, 27 between the plies 10, 12, 14.

The plies 10, 12, 14 of the water soluble article 1 can be viewed hierarchically starting from the form in which the consumer interacts with the water soluble article 1 and working backward to the raw materials from which the plies 10, 12, 14 are made. The plies, fibrous elements, and components thereof are described in more detail below.

Plies/Fibrous Structures

The plies may be in the form of fibrous structures that comprise one or more fibrous elements. The fibrous elements can be associated with one another, for example being entangled and/or laid down in non-woven fashion, to form a fibrous structure. Fibrous structures can include particles within and/or on the structure. Fibrous structures can be homogeneous, layered, unitary, zoned, or as otherwise desired, with different active agents defining the various aforesaid portions.

A fibrous structure can comprise one or more layers, the layers together forming the ply. A ply having a plurality of layers can be formed by depositing a plurality of fibrous elements having a distinguishing characteristic to form a first layer and then depositing a second layer of fibrous elements on top of the first layer.

A fibrous structure can comprise a plurality of identical or substantially identical from a compositional perspective of fibrous elements. Optionally, the fibrous structure may comprise two or more different fibrous elements. Non-limiting examples of differences in the fibrous elements may be physical differences such as differences in diameter, length, texture, shape, rigidity, elasticity, and the like; chemical differences such as crosslinking level, solubility, melting point, glass transition temperature, active agent, filament-forming material, color, level of active agent, basis weight, level of filament-forming material, presence of any coating on fibrous element, biodegradable or not, hydrophobic or not, contact angle, and the like;

differences in whether the fibrous element loses its physical structure when the fibrous element is exposed to conditions of intended use; differences in whether the fibrous elements morphology changes when the fibrous element is exposed to conditions of intended use; and differences in rate at which the fibrous element releases one or more of its active agents when the fibrous element is exposed to conditions of intended use. In one example, two or more fibrous elements and/or particles within the fibrous structure may comprise different active agents.

The fibrous structure may exhibit different regions, such as different regions of basis weight, density and/or caliper, surface texture, pattern of fibrous structure, embossing pattern, apertures, apertures in a pattern, and the like.

The plies/fibrous structure of the present invention may be used as is or may be coated with one or more active agents.

Fibrous Elements

The plies and/or fibrous structures may be comprise fibrous elements. The fibrous elements may be water soluble. The fibrous elements may include one or more filament forming materials, one or more active agents such surfactant, or combinations thereof. The active agents may be releasable from the fibrous elements, such as when the fibrous element and/or fibrous structure comprising the fibrous element is exposed to conditions of intended use. Fibrous elements that include an active agent, such as a surfactant, are preferred, as such elements provide more efficient loading of active agents and less formulation space lost to filament forming materials and/or carriers. Surfactant may be particularly preferred due to the cleaning benefits it can provide.

The fibrous elements can comprise from about 5% to about 95%, or more than 50%, by weight on a dry fibrous element basis and/or dry fibrous structure basis, of one or more filament-forming materials. The fibrous elements can comprise from about 5% to about 95%, or more than 50%, by weight on a dry fibrous element basis and/or dry fibrous structure basis, of one or more active agents, such as surfactant.

The fibrous elements may be meltblown fibrous elements, spunbond fibrous elements, hollow fibrous elements, or the like. The fibrous elements may be hydrophilic or hydrophobic. The fibrous elements may be surface treated and/or internally treated to change the inherent hydrophilic or hydrophobic properties of the fibrous element. The fibrous elements can have a diameter of less than about 100 μm and/or less than about 75 μm and/or less than about 50 μm and/or less than about 25 μm and/or less than about 10 urn and/or less than about 5 μm and/or less than about 1 μm as measured according to the Diameter Test Method described herein. The fibrous elements can have a diameter from about 1 μm to about 500 μm, optionally about 1 μm to about 1.00 μm, optionally about 1 μm to about 50 μm, optionally about 1 μm to about 30 μm, optionally about 5 μm to about 15 μm, optionally about 7 μm to about 15 μm according to the Diameter Test Method described herein. The fibrous elements can have a diameter of greater than about 1 μm as measured according to the Diameter Test Method described herein. The smaller the diameter the faster the rate of release of the active agents and the rate of loss and or altering of the fibrous element's 30 physical structure.

The fibrous element may comprise an active agent within the fibrous element and an active agent on an external surface of the fibrous element, such as an active agent coating on the fibrous element. The active agent on the external surface of the fibrous element may be the same or different from the active agent present in the fibrous element. If different, the active agents may be compatible or incompatible with one another.

The one or more active agents may be uniformly distributed or substantially uniformly distributed throughout the fibrous element. The active agents may be distributed as discrete regions within the fibrous element. The at least one active agent can be distributed uniformly or substantially uniformly throughout the fibrous element and at least one other active agent is distributed as one or more discrete regions within the fibrous element. Optionally, at least one active agent is distributed as one or more discrete regions within the fibrous element and at least one other active agent is distributed as one or more discrete regions different from the first discrete regions within the fibrous element.

Filament-Forming Material

The fibrous elements may comprise one or more filament-forming material. The filament-forming material may be any suitable material, such as a polymer or monomers capable of producing a polymer that exhibits properties suitable for making a filament, such as by a spinning process. The filament-forming material may be synthetic or naturally derived.

The filament-forming material may comprise a polar solvent-soluble material, such as an alcohol-soluble material and/or a water-soluble material, preferably a water-soluble material, which can be beneficial for product applications that include use of water. The filament-forming material may comprise a non-polar solvent-soluble material.

The filament-forming material may comprise a water-soluble material and be substantially free (less than 5% and/or less than 3% and/or less than 1% and/or 0% by weight on a dry fibrous element basis and/or dry fibrous structure basis) of water-insoluble materials.

The filament-forming material may comprise a polymer selected from the group consisting of: polymers derived from acrylic monomers such as the ethylenically unsaturated carboxylic monomers and ethylenically unsaturated monomers, polyvinyl alcohol and/or copolymers thereof, polyvinylformamide, polyvinylamine, polyacrylates, polymethacrylates, copolymers of acrylic acid and methyl acrylate, polyvinylpyrrolidones, polyalkylene oxides, starch and starch derivatives, pullulan, gelatin, and cellulose derivatives (for example, hydroxypropylmethyl celluloses, methyl celluloses, carboxymethy celluloses). The filament-forming material may, comprise polyvinyl alcohol, polyvinyl alcohol copolymers, starch, starch derivatives, cellulose derivatives, or mixtures thereof.

Active Agents

The fibrous elements may comprise one or more active agents. One or more active agents may also be present in or on the fibrous structure, and/or in a particle. Active agents are a class of additives that are designed and intended to provide a benefit to something other than the fibrous element and/or particle and/or fibrous structure itself, such as providing a benefit to an environment external to the fibrous element and/or particle and/or fibrous structure. For example, the active agent may be selected to provide a benefit to a surface in need of treatment.

The active agent may be selected from the group consisting of: personal cleansing and/or conditioning agents such as hair care agents such as shampoo agents and/or hair colorant agents, hair conditioning agents, skin care agents, sunscreen agents, and skin conditioning agents; laundry care and/or conditioning agents such as fabric care agents, fabric conditioning agents, fabric softening agents, fabric anti-wrinkling agents, fabric care anti-static agents, fabric care stain removal agents, soil release agents, dispersing agents, suds suppressing agents, suds boosting agents, anti-foam agents, and fabric refreshing agents; liquid and/or powder dishwashing agents (for hand dishwashing and/or automatic dishwashing machine applications), hard surface care agents, and/or conditioning agents and/or polishing agents; other cleaning and/or conditioning agents such as antimicrobial agents, antibacterial agents, antifungal agents, fabric hueing agents, perfume, bleaching agents (such as oxygen bleaching agents, hydrogen peroxide, percarbonate bleaching agents, perborate bleaching agents, chlorine bleaching agents), bleach activating agents, chelating agents, builders, lotions, brightening agents, air care agents, carpet care agents, dye transfer-inhibiting agents, clay soil removing agents, anti-redeposition agents, polymeric soil release agents, polymeric dispersing agents, alkoxylated polyamine polymers, alkoxylated polycarboxylate polymers, amphilic graft copolymers, dissolution aids, buffering systems, water-softening agents, water-hardening agents, pH adjusting agents, enzymes, flocculating agents, effervescent agents, preservatives, cosmetic agents, make-up removal agents, lathering agents, deposition aid agents, coacervate-forming agents, clays, thickening agents, latexes, silicas, drying agents, odor control agents, antiperspirant agents, cooling agents, warming agents, absorbent gel agents, anti-inflammatory agents, dyes, pigments, acids, and bases; liquid treatment active agents; agricultural active agents; industrial active agents; ingestible active agents such as medicinal agents, teeth whitening agents, tooth care agents, mouthwash agents, periodontal gum care agents, edible agents, dietary agents, vitamins, minerals; water-treatment agents such as water clarifying and/or water disinfecting agents, and mixtures thereof.

The fibrous elements may comprise a surfactant. Non-limiting examples of suitable surfactants include anionic surfactants, cationic surfactants, nonionic surfactants, zwitterionic surfactants, amphoteric surfactants, and mixtures thereof. The fibrous elements may contain an anionic surfactant, such as sulfated or sulfonated surfactants. The anionic surfactant may include alkyl alkoxylated sulfate such as alkyl ethoxylated sulfate (AES), alkyl benzene sulfonate such as linear alkyl benzene sulfonate (LAS), or mixtures thereof. The fibrous elements may contain LAS, which may improve the cleaning profile and/or dissolution profile of the fibrous elements.

The fibrous elements and/or the plies may include a perfume. The perfume may comprise a perfume ingredient selected from the group consisting of: aldehyde perfume ingredients, ketone perfume ingredients, esters, and mixtures thereof. Also included are various natural extracts and essences which can comprise complex mixtures of ingredients, such as orange oil, lemon oil, rose extract, lavender, musk, patchouli, balsamic essence, sandalwood oil, pine oil, cedar, and the like. In one example, a finished perfume typically comprises from about 0.01% to about 2% by weight on a dry fibrous element basis and/or a dry particle basis and/or dry fibrous structure basis.

The perfume may be neat perfume, delivered by a perfume delivery system, or a combination thereof. The perfume delivery system may be an encapsulate. Encapsulated perfumes comprise a core that comprises the perfume and a shell that comprises the encapsulate wall. The encapsulate can be a pressure sensitive encapsulate.

The fibrous elements and/or particles of the present invention may comprise one or more bleaching agents. Non-limiting examples of suitable bleaching agents include peroxyacids, perborate, percarbonate, chlorine bleaches, peroxygen bleach, percarboxylic acid bleach and salts thereof, oxygen bleaches, persulfate bleach, hypohalite bleaches, bleach precursors, bleach activators, bleach catalysts, hydrogen peroxide, bleach boosters, photobleaches, bleaching enzymes, free radical initiators, peroxygen bleaches, and mixtures thereof.

The fibrous elements, particles, and/or fibrous structures may comprise enzymes. Non-limiting examples of suitable enzymes include proteases, amylases, lipases, cellulases, carbohydrases including mannanases and endoglucanases, pectinases, pectate lyases, hemicellulases, peroxidases, xylanases, phospholipases, esterases, cutinases, keratanases, reductases, oxidases, phenoloxidases, lipoxygenases, ligninases, pullulanases, tannases, penosanases, malanases, glucanases, arabinosidases, hyaluraonidases, chrondroitinases, laccases, and mixtures thereof.

One or more active agents may be released from the fibrous element and/or particle and/or fibrous structure when the fibrous element and/or particle and/or fibrous structure is exposed to a triggering condition, for example exposure to water. The fibrous elements may be water-soluble and may release the one or more active agents when solubilized in water. When the article is used to treat fabrics or hard surfaces, the triggering condition may occur in a wash or other treatment liquor, for example in an automatic washing machine, or as part of a pretreatment step. When the article is used as a personal care product, the triggering condition may occur in a bathing, showering, hand-washing, or other body-washing context.

Extensional Aids

The fibrous elements may comprise extensional aids. Non-limiting examples of extensional aids can include polymers, other extensional aids, and combinations thereof. High molecular weight extensional aids can be used since they have the ability to increase extensional melt viscosity and reduce melt fracture.

Non-limiting examples of polymers that can be used as extensional aids may include alginates, carrageenans, pectin, chitin, guar gum, xanthum gum, agar, gum arabic, karaya gum, tragacanth gum, locust bean gum, alkylcellulose, hydroxyalkylcellulose, carboxyalkylcellulose, and mixtures thereof. Nonlimiting examples of other extensional aids can include modified and unmodified polyacrylamide, polyacrylic acid, polymethacrylic acid, polyvinyl alcohol, polyvinylacetate, polyvinylpyrrolidone, polyethylene vinyl acetate, polyethyleneimine, polyamides, polyalkylene oxides including polyethylene oxide, polypropylene oxide, polyethylenepropylene oxide, and mixtures thereof.

Particles

The articles of the present disclosure may comprise particles. "Particle" as used herein means a solid additive, such as a powder, granule, encapsulate, microcapsule, and/or prill. The particles may exhibit a median particle size of 2000 µm or less as measured according to the Median Particle Size Test Method described herein. The particle may exhibit a median particle size of from about 1 µm to about 2000 µm, from about 1 µm to about 1600 µm, from about 1 µm to about 800 µm, from about 5 µm to about 500 µm, from about 10 µm to about 300 µm, from about 10 µm to about 100 µm, from about 10 µm to about 50 µm, and/or from about 10 µm to about 30 µm as measured according to the Median Particle Size Test Method described herein. The shape of the particle can be in the form of spheres, rods, plates, tubes, squares, rectangles, discs, stars, fibers or have regular or irregular random forms.

The particles may comprise particles of the same type (e.g., including the same one or more active agents) or of different types (e.g., particles that include different active agents). The particles may be soluble or insoluble in water; the article may comprise both soluble particles and insoluble particles. The particles may be core-in-shell encapsulates.

The particles may comprise one or more active agents; suitable active agents are described above. The particles may be frangible and may release an active agent when broken.

The one or more active agents of the particles may comprise a surfactant, such as an anionic surfactant. The particle may comprise a sulfated anionic surfactant, such as alkyl ethoxylated sulfate (AES). The surfactant of the particle may be different from the surfactant of the fibrous elements. For example, the particle may comprise AES surfactant, and the fibrous elements may comprise alkyl benzene sulfonate, preferably linear alkyl benzene sulfonate (LAS). Providing different surfactants may be advantageous with regard to the cleaning profile and/or the dissolution profile of the article 1.

The one or more active agents of the particles may comprise a polymer. The polymer may be a nitrogen-containing polymer, such as a polyalkyleneimine polymer, preferably a polyethyleneimine (PEI) polymer. The polymer may be alkoxylated, preferably ethoxylated and/or propoxylated. The polymer may be an ethoxylated PEI polymer, which may be optionally also propoxylated. Such polymers may improve the cleaning profile of the particles and the articles that comprise them. The polymers may also provide viscosity benefits to a particle-forming composition. Suitable polymers include PEI600 EO20 (ex BASF SE).

The one or more active agents of the particles may comprise perfume; the particles may be perfume encapsulates. The one or more active agents of the particles may comprise enzymes; the particles may comprise enzyme prills.

One or more plies of an article may comprise the particles. The particles may be entrapped by a plurality of the fibrous elements. A fibrous element may comprise a particle; for example, the particle may be stuck to the fibrous element. The particles may be located on a surface of a ply 10, for example as a coating. The particles may be located between plies 10, 12, for example in an interior space between plies 10, 12. The particles may be provided as a particle slurry and may be deposited onto the article 1, onto a ply 10, 12, 14, or may be combined with the fibrous elements 20 as the fibrous elements are deposited onto an endless surface.

Process of Making Water-Soluble Unit Dose Articles

The present disclosure relates to processes of making water-soluble unit dose articles. Broadly, the process may include the steps of providing a water-soluble web 100 and cutting the web 100 in a tessellated pattern 102 to form a plurality of water-soluble unit dose articles 1.

The process may include providing a water-soluble web 100. The web 100 may comprise a plurality of fibrous elements 20. Each fibrous element 20 may include at least one filament forming material and optionally a surfactant. Fibrous elements 20 and the components thereof are described in more detail above.

The web may include at least a first ply. The web 100 may include a second ply, or even a third ply. The multiple plies may be formed, at least in part, from a single parent material that is folded upon itself to form the web 100. The multiple plies may be formed, at least in part, from a single parent material that is cut and stacked upon itself to form the web 100. The material may be flipped or rotated by 180° in addition to being folded and/or stacked. As discussed above, the plies may include more than one layer.

Figure 8:
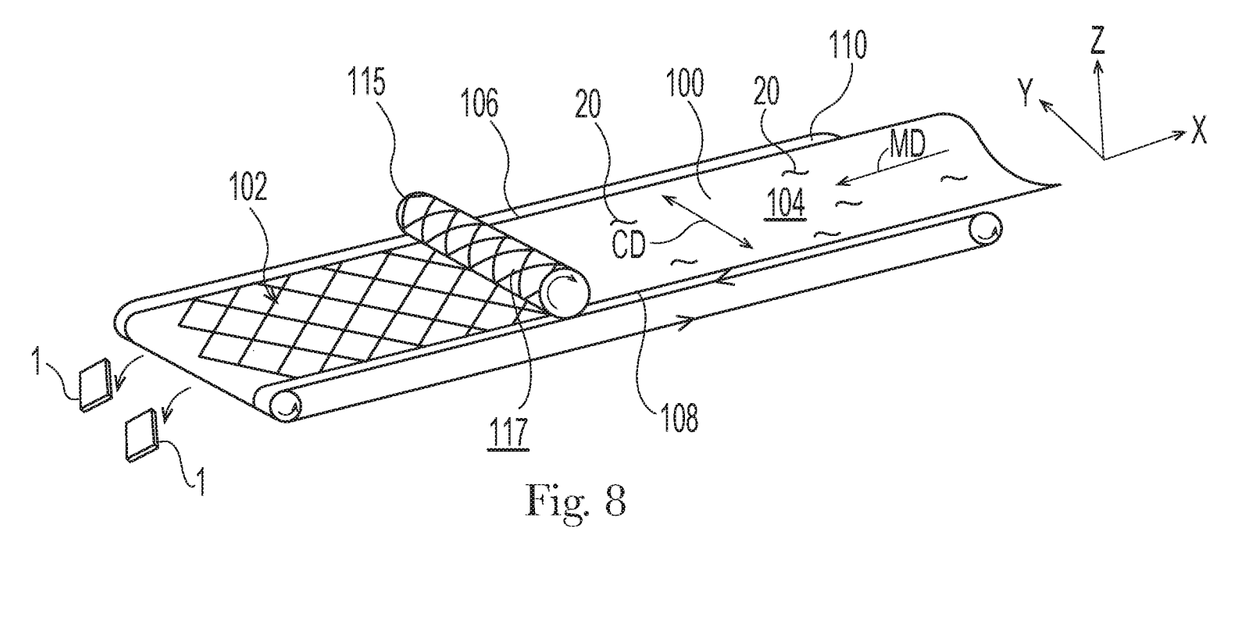
FIG. 8 shows a process of cutting a web in a tessellated pattern.

As shown in FIG. 8, the web 100 may be located on an endless surface 110, such as a belt. The web 100 may be moving in a machine direction MD. The web may have a width in the cross-machine direction CD, which is orthogonal to the machine direction MD in the plane of the endless surface 110.

The web 100 may include a middle portion 104 near the centerline of the web 100 in the machine direction MD. The web 100 may include side edges 106, 108 away from the centerline in the cross-machine direction CD.

A cutting apparatus 115 may cut the web 100 in a tessellated pattern 102. The cutting apparatus 115 may be die cutter, for example a rotary die cutter. The cutting apparatus 115 may include a tessellated surface 117 that corresponds to the tessellated pattern 102.

Cutting the web 100 in a tessellated pattern 102 can form unit dose articles 1. The resulting unit dose articles 1 may be of the same size and/or shape. The resulting unit dose articles 1 may have different sizes and/or shapes.

After cutting the web 100, at least some of the unit dose articles 1 may be separated prior to packaging. Alternatively, some or all of the unit dose articles 1 may remain connected, at least partially. For example, the web 100 may be scored or perforated between the unit dose articles 1. Prior to use, the articles 1 could be torn away or otherwise separated from the other articles by a consumer and used as intended. In the present disclosure, it is contemplated that "cutting" the web 100 may including scoring and/or perforating the web 100 in a tessellated pattern.

Figure 9:
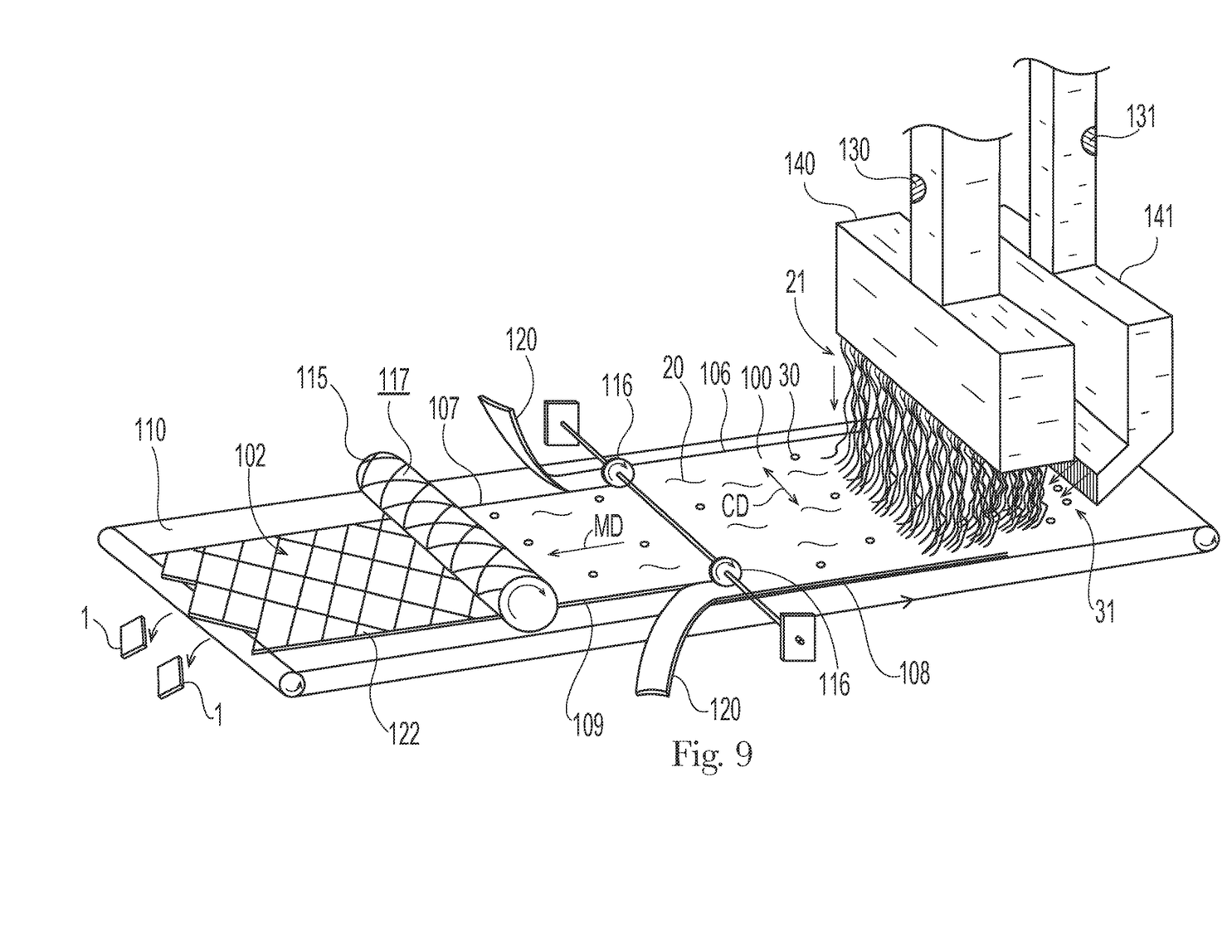
FIG. 9 shows a process of making a web and cutting the web in a tessellated pattern.

As shown in FIG. 9, a portion 120 of the web that does not form unit dose articles may be removed. A portion 120 of the web 100 may be removed prior to cutting the web 100 in the tessellated pattern 102. The web 100 may be cut by a cutting tool, such as a rotating blade 116. The removed portion 120 may be near a side edge 106, 108 of the web 100, resulting in a trimmed edge 107, 109 of the remaining web. Trimming the web 100 in such fashion may be useful to provide a more uniform web 100 prior to cutting the web 100 into unit dose articles 1. For example, the web 100 may be relatively thinner near the side edges 106, 108 compared to the middle portion 104, resulting in webs 100 and/or articles 1 having nonuniform caliper, which may require additional handling or result in product variability. As a result of the removal or trimming step, the width of the web 100 measured from trimmed edge 107 to trimmed edge 109, measured in the cross-machine direction CD, will be less than the width of the web 100 as measured from the (untrimmed) side edge 106 to side edge 108.

A portion 122 may be removed after the web 100 has been cut in a tessellated fashion. Such portions 122 may be located near a side edge 106, 108 and/or a finished edge 107, 109. It may be desirable to remove portions 122 after cutting when the portions 122 are not suitable for sale as a finished product, such as a unit dose article 1. Such portions 122 may be excess trim that is discarded or recycled. It is believed that tessellation according to the present disclosure is useful in minimizing such portions 122. In particular, it is expected that little to no such trim will be removed from the middle portion 104 of the web 100 after cutting.

The web 100 may be pre-made (i.e., at a different time and/or location). The web 100 may then be fed onto an endless surface 110.

The web may be made as part of a continuous article manufacturing process. Thus, the process of the present disclosure may include a web-forming step. Forming the web in a continuous process may be advantageous because there is no pre-made web to store and/or transport. For example, fibrous elements 20 may be deposited in a fibrous element stream 21 onto an endless surface 110 that is moving in a machine direction MD to form the web 100. The process may comprise the step of providing a solution of a filament-forming composition 130.

The filament-forming composition 130 may be passed through one or more die block assemblies 140, which may comprise a plurality of spinnerets, to form a plurality of fibrous elements 20. Optionally, multiple filament-forming compositions may be supplied to a single die block assembly 40 or portions thereof or multiple filament-forming compositions may be supplied to multiple die block assemblies.

Multiple die block assemblies may be useful when more than one layer in a web 100 or ply is desired.

The fibrous elements of the present invention may be made from a filament-forming composition. The filament-forming composition can be a polar-solvent-based composition, preferably a water-based composition. The filament-forming composition may comprise from about 10% to about 80% by weight of a polar solvent, such as water. The filament-forming composition may be an aqueous composition comprising one or more filament-forming materials and one or more active agents.

The filament-forming composition may comprise one or more release agents and/or lubricants, such as fatty acids, fatty acid salts, fatty alcohols, fatty esters, sulfonated fatty acid esters, fatty amine acetates and fatty amides, silicones, aminosilicones, fluoropolymers and mixtures thereof. The filament-forming composition may comprise one or more antiblocking and/or detackifying agents, such as starches, modified starches, crosslinked polyvinylpyrrolidone, cross-linked cellulose, microcrystalline cellulose, silica, metallic oxides, calcium carbonate, talc and mica.

A suitable spinning operation and/or spinning process may be used to form a fibrous material from the filament-forming composition, including spunbonding, melt blowing, electro-spinning, rotary spinning, continuous filament producing and/or tow fiber producing operations/processes. For example, the filament-forming composition may spun into a plurality of fibrous elements by meltblowing. The filament-forming composition may be pumped from a tank to a meltblown spinnerette. Upon exiting one or more of the filament-forming holes in the spinnerette, the filament-forming composition may be attenuated with air to create one or more fibrous elements and/or particles. The fibrous elements may then be dried to remove any remaining solvent used for spinning, such as the water.

The spinnerets may comprise a plurality of fibrous element-forming holes that include a melt capillary encircled by a concentric attenuation fluid hole through which a fluid, such as air at a temperature from about 10 C to about 100 C, can pass to facilitate attenuation of the filament-forming composition into a fibrous element as it exits the fibrous element-forming hole. The filament-forming composition can be provided to the fibrous-element forming hole at a rate of about 0.1 to about 2 g/min per hole, which can be set based on the composition of the filament-forming composition.

The process may include adding particles 30 to the web 100, for example, by combining (e.g., by blowing) particles 30 in a particle stream 31 with the fibrous elements 20 as they are deposited as a fibrous elements stream 21 on the endless surface 110 moving in the machine direction MD. Additionally, or alternatively, the process may include adding particles 30 to the web 100 after the fibrous elements 20 have been placed upon the endless surface 110. Prior to combining the particles 30 with the fibrous elements 20 and/or the web 100, the particles 30 may be in the form of a particle slurry 131. The particle slurry 131 may be passed through one or more die block assemblies 141.

The fibrous elements and/or particles of the present invention may be collected on an endless surface, such as a belt, e.g., a patterned belt or flat belt, to form a ply 10 or web 100.

Although not shown in FIG. 9, the web 100 may be modified before or after the step of cutting the web 100 into the unit dose articles 1. For example, active ingredients may be added to the web by spraying, brushing, coating, and/or applying a bead of a composition that includes the active ingredient(s). The active ingredients may be added in a continuous manner, which may be advantageous because adding the ingredients intermittently can lead to registration problems when the web is cut, and inconsistent articles 1 as a result. Cutting the web 100 in a tessellated pattern 102 can help to reduce the waste of these active ingredients, in addition to reducing waste of the web material itself (e.g., the fibrous elements 20).

When the web 100 includes at least a first and second ply 10, 12, the process may further comprise the step of joining at least the first ply 10 and the second ply. The steps of cutting the web 100 and joining the first and second plies 10, 12 may occur in a single step or action. For example, the cutting apparatus 110, such as a die cutter, may be configured to join or seal the plies 10, 12 together at the same time it cuts the web 100. The plies may optionally be joined by using a bonding roll, or via thermal bonding, calendar bonded, point bonded, ultrasonically bonded, infrared bonded, through air bonded, needle punched, hydroentangled, melt bonded, adhesive bonded, or other known technical approach for bonding plies of material.

When the web 100 comprises at least two plies, the cutting of the web 100 and the joining of at least the first and second plies may occur in the same step. The plies can be bonded to one another and die cut in a single step using a single rotary bonding and die cutting apparatus.

The web 100 and/or the unit dose articles 1 may be printed upon. The printing can be laser jet, ink jet, gravure, pad, rotogravure, flexographic, offset, screen, lithographic, or any other printing approach suitable for printing webs of material, particularly process that are best suited for nonwoven materials.

The process may comprise placing the water-soluble unit dose articles 1 in a container. The container may be an open package. After the articles 1 are placed into the open package, the package may be sealed to form a closed package. The closed package may be suitable for vending to consumers. The package may be a box, optionally with a removable tray, or a flexible bag. The package may be substantially impervious to ingress by water and/or water vapor. Such packages are desirable because water may negatively affect the integrity of the water-soluble unit dose articles 1, leading, e.g., to a poor consumer experience.

Combinations

Specifically contemplated combinations of the disclosure are herein described in the following lettered paragraphs. These combinations are intended to be illustrative in nature and are not intended to be limiting.

A. A plurality of water-soluble unit dose articles, each article comprising at least a first ply, the first ply comprising a plurality of fibrous elements, each fibrous element comprises at least one filament-forming material and, optionally, a surfactant; wherein each water-soluble unit dose article comprises a perimeter that defines a shape in an X-Y plane, each water-soluble unit dose article also including a thickness in a Z direction that is orthogonal to the X-Y plane, wherein the shapes defined by the perimeters are able to form a tessellated pattern.

B. A plurality of water-soluble unit dose articles according to paragraph A, wherein the shape defined by the perimeter of at least one article includes a concave portion.

C. A plurality of water-soluble unit dose articles according to any of paragraphs A-B, wherein the perimeter of at least one article does not include a concave portion.

D. A plurality of water-soluble unit dose articles according to any of paragraphs A-C, wherein the perimeter of at least one article, preferably the perimeters of all of the articles, defines a shape that is non-rectangular.

E. A plurality of water-soluble unit dose articles according to any of paragraphs A-D, wherein the perimeter of at least one article includes at least one internal angle that is greater than 90°.

F. A plurality of water-soluble unit dose articles according to any of paragraphs A-E, wherein each article includes a length defined as the longest dimension in the X-Y plane, wherein the thickness is less than about 20% of the length.

G. A plurality of water-soluble unit dose according to any of paragraphs A-F, wherein the thickness of each article is at least about 1% of the length.

H. A plurality of water-soluble unit dose articles according to any of paragraphs A-G, wherein at least one article further comprises a second ply.

I. A plurality of water-soluble unit dose articles according to any of paragraphs A-H, wherein the at least one article further comprises a third ply.

J. A plurality of water-soluble unit dose articles according to any of paragraphs A-I, wherein the first and second plies of the at least one article are joined at an edge seal.

K. A plurality of water-soluble unit dose articles according to any of paragraphs A-J, wherein the edge seal has a seal breadth of from about 0.5 mm to about 4 mm as measured according to the Edge Seal Strength Test Method.

L. A plurality of water-soluble unit dose articles according to any of paragraphs A-K, wherein at least one article comprises particles.

M. A process of making a plurality of water-soluble unit dose articles, the process comprising the steps of providing a water-soluble web, the web comprising a plurality of fibrous elements, each fibrous element comprises at least one filament-forming material and, optionally, a surfactant; and cutting the web in a tessellated pattern to form a plurality of water-soluble unit dose articles.

N. A process according to paragraph M, wherein the web is located on an endless surface and is moving in a machine direction.

O. A process according to any of paragraphs M-N, wherein a portion of the web is removed prior to cutting the web in the tessellated pattern.

P. A process according to any of paragraphs M-O, where the portion that is removed is near an edge of the web.

Q. A process according to any of paragraphs M-P, wherein the web comprises at least a first ply and a second ply.

R. A process according to any of paragraphs M-Q, wherein the process further comprises joining the first ply and the second ply.

S. A process according to any of paragraphs M-R, wherein the cutting of the web and the joining of the first and second plies occur in the same step.

T. A process according to any of paragraphs M-S, wherein the process further comprises placing the water-soluble unit dose articles in an open package and sealing the open package to form a closed package.

U. A process or article according to any of paragraphs A-T, wherein the article(s) have a length (i.e., the longest dimension) of no greater than 15 cm, or no greater than 12 cm, or no greater than 10 cm, optionally the length being no less than 3 cm, no less than 4 cm, or no less than 5 cm, or no less than 6 cm, and having a ratio of the perimeter to the area of the shape defined by the perimeter ("perimeter:area ratio") in the range of from 3:10 cm$^{-1}$, or from 4:10 cm$^{-1}$, to no greater than 12:10 cm$^{-1}$ (e.g., 1.2 cm$^{-1}$), or no greater than 10:10 cm$^{-1}$, or no greater than 8:10 cm$^{-1}$, or no greater than 6:10 cm$^{-1}$.

Test Methods

Thickness Test Method

The thickness of a fibrous structure and/or article height is measured using a ProGage Thickness Tester (Thwing-Albert Instrument Company, West Berlin, N.J.) with a circular pressure foot diameter of 2.00 inches (area of 3.14 in$^2$) at a pressure of 15.5 g/cm$^2$. Five (5) samples are prepared by cutting samples of a fibrous structure such that each cut sample is larger in size than the pressure foot surface, avoiding creases, folds, and obvious defects. If an article has a length or width less than the diameter of the pressure foot a smaller diameter pressure foot may be used, while making the appropriate adjustments so that a pressure of 15.5 g/cm$^2$ is still applied. An individual sample is placed on the anvil with the sample centered underneath the pressure foot, or centered on the location of the maximum height of an article. The foot is lowered at 0.03 in/sec to an applied pressure of 15.5 g/cm$^2$. The reading is taken after 3 sec dwell time, and the foot is raised. The measure is repeated in like fashion for the remaining 4 samples. The thickness or article height is calculated as the average thickness of the five samples and is reported to the nearest 0.01 mm.

Diameter Test Method

The diameter of a discrete fibrous element or a fibrous element within a fibrous structure is determined by using a Scanning Electron Microscope (SEM) or an Optical Microscope and an image analysis software. A magnification of 200 to 10,000 times is chosen such that the fibrous elements are suitably enlarged for measurement. When using the SEM, the samples are sputtered with gold or a palladium compound to avoid electric charging and vibrations of the fibrous element in the electron beam. A manual procedure for determining the fibrous element diameters is used from the image (on monitor screen) taken with the SEM or the optical microscope. Using a mouse and a cursor tool, the edge of a randomly selected fibrous element is sought and then measured across its width (i.e., perpendicular to fibrous element direction at that point) to the other edge of the fibrous element. A scaled and calibrated image analysis tool provides the scaling to get actual reading in μm. For fibrous elements within a fibrous structure, several fibrous element are randomly selected across the sample of the fibrous structure using the SEM or the optical microscope. At least two portions of the fibrous structure are cut and tested in this manner. Altogether at least 100 such measurements are made and then all data are recorded for statistical analysis. The recorded data are used to calculate average (mean) of the fibrous element diameters, standard deviation of the fibrous element diameters, and median of the fibrous element diameters.

Another useful statistic is the calculation of the amount of the population of fibrous elements that is below a certain upper limit. To determine this statistic, the software is programmed to count how many results of the fibrous element diameters are below an upper limit and that count (divided by total number of data and multiplied by 100%) is reported in percent as percent below the upper limit, such as percent below 1 micrometer diameter or %-submicron, for example. We denote the measured diameter (in μm) of an individual circular fibrous element as di.

In the case that the fibrous elements have non-circular cross-sections, the measurement of the fibrous element diameter is determined as and set equal to the hydraulic diameter which is four times the cross-sectional area of the fibrous element divided by the perimeter of the cross-section of the fibrous element (outer perimeter in case of hollow fibrous elements). The number-average diameter, alternatively average diameter is calculated as:

$$d_{num} = \frac{\sum_{i=1}^{n} d_i}{n}$$

Median Particle Size Test Method

This test method must be used to determine median particle size, which, as used herein, refers to the volume weighted mean particle size.

Particle size is measured using an Accusizer 780A, made by Particle Sizing Systems, Santa Barbara Calif. The instrument is calibrated from 0 to 300 μm using Duke particle size standards. Samples for particle size evaluation are prepared by diluting about 1 g emulsion, if the volume weighted mean particle size of the emulsion is to be determined, or 1 g of capsule slurry, if the finished capsule volume weighted mean particle size is to be determined, in about 5 g of de-ionized water and further diluting about 1 g of this solution in about 25 g of water.

About 1 g of the most dilute sample is added to the Accusizer and the testing initiated, using the autodilution feature. The Accusizer should be reading in excess of 9200 counts/second. If the counts are less than 9200 additional sample should be added. The accusizer will dilute the test sample until 9200 counts/second and initiate the evaluation. After 2 minutes of testing the Accusizer will display the results, including volume-weighted median size.

The broadness index can be calculated by determining the particle size at which 95% of the cumulative particle volume is exceeded (95% size), the particle size at which 5% of the cumulative particle volume is exceeded (5% size), and the median volume-weighted particle size (50% size-50% of the particle volume both above and below this size).

Broadness Index(5)=((95% size)−(5% size)/50% size).

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 3.500 in ±0.0035 in by 3.500 in ±0.0035 in may be used to prepare the samples.

With a precision cutting die of suitable size, cut the samples into squares. Combine the cut squares to form a stack twelve samples thick. Measure the mass of the sample stack and record the result to the nearest 0.001 g.

The Basis Weight is calculated in lbs/3000 ft² or g/m² as follows:

Basis Weight=(Mass of stack)/[(Area of 1 square in stack)×(No. of squares in stack)]

Report result to the nearest 0.1 lbs/3000 ft² or 0.1 g/m². Sample dimensions can be changed or varied using a similar precision cutter as mentioned above, so as at least 100 square inches of sample area in stack.

Edge Seal Breadth

For a given unit dose article, randomly select five locations of the flange of the edge seal.

Measure and record the linear distance across the seal on the specimen (identified as seal dimension "X" in FIG. 2 of ASTM F88/F88M-09) to the nearest 0.1 mm. Report the statistical mean of the five measurements as the edge seal breadth.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process of making a plurality of water-soluble unit dose articles, the process comprising:
providing a water-soluble fibrous web comprising a first ply and a second ply, the fibrous web comprising a plurality of entangled fibrous elements, each fibrous element comprises at least one filament-forming material;
joining the first and second plies; and
cutting the web in a tessellated pattern to form a plurality of water-soluble unit dose articles, wherein the cutting of the web and the joining of the first and second plies occur in the same step.

2. A process according to claim 1, wherein the web is located on an endless surface and is moving in a machine direction.

3. A process according to claim 1, wherein a portion of the web is removed prior to cutting the web in the tessellated pattern.

4. A process according to claim 3, where the portion that is removed includes an edge of the web.

5. A process according to claim 1, wherein the process further comprises placing the water-soluble unit dose articles in an open package and sealing the open package to form a closed package.

6. The process according to claim 1, wherein the tessellated pattern is non-rectangular.

7. The process according to claim 6, wherein at least one of the articles includes a perimeter with an internal angle that is greater than 90°.

8. The process according to claim 1, wherein each article includes a length defined as the longest dimension in an X-Y plane, wherein the thickness is about 20% or less of the length.

* * * * *